United States Patent [19]
von Gutfeld

[11] Patent Number: 6,055,156
[45] Date of Patent: Apr. 25, 2000

[54] CASE FOR PORTABLE COMPUTERS FOR ENHANCED HEAT DISSIPATION

[75] Inventor: Robert Jacob von Gutfeld, New York, N.Y.

[73] Assignee: International Business Machines Corporation, Armonk, N.Y.

[21] Appl. No.: 09/372,029

[22] Filed: Aug. 11, 1999

Related U.S. Application Data

[62] Division of application No. 09/025,711, Feb. 18, 1998.

[51] Int. Cl.[7] ........................................ H05K 7/20
[52] U.S. Cl. ............................................... 361/690
[58] Field of Search ................... 361/600, 679, 361/687–688, 690–695, 724, 728, 730

[56] References Cited

U.S. PATENT DOCUMENTS

| | | |
|---|---|---|
| 3,364,395 | 1/1968 | Donofrio et al. . |
| 5,065,278 | 11/1991 | Schultz . |
| 5,309,315 | 5/1994 | Naedel et al. . |
| 5,440,450 | 8/1995 | Lau et al. . |
| 5,634,351 | 6/1997 | Larson et al. . |
| 5,666,261 | 9/1997 | Aguilera . |
| 5,751,550 | 5/1998 | Korinsky ................................ 361/695 |

FOREIGN PATENT DOCUMENTS

| | | |
|---|---|---|
| 2354260 | 10/1973 | Germany . |
| 06318124A | 11/1994 | Japan . |

*Primary Examiner*—Gregory Thompson
*Attorney, Agent, or Firm*—Whitman, Curtis & Whitman; Louis J. Percello

[57] ABSTRACT

A computer case shaped to provide cooling of the computer's electronic parts is described. The case is formed from metal or thin plastic which can be stamped or injection molded in the desired shape for cooling. The case has a plurality of sides and a bottom. In a first aspect, a plurality of ribs is formed on at least one of the sides, thereby increasing the surface area available for heat dissipation. The bottom may also be corrugated. In a second aspect, slots are provided in at least one of the sides, and the heat generating microprocessor is positioned adjacent to the slotted sides. In a third aspect, a plate is attached to the bottom by means of angled edges at the periphery of the plate so as to allow a gap between the attached plate and the case bottom for trapping a gas therebetween and providing insulation from heat at the case bottom. Optionally, openings are provided in the angled edges for additional convective cooling of the case bottom.

2 Claims, 4 Drawing Sheets

CASE FOR PORTABLE COMPUTERS FOR ENHANCED HEAT DISSIPATION

This is a divisional application of co-pending U.S. Application Ser. No. 09/025,711, filed on Feb. 18, 1998.

BACKGROUND OF THE INVENTION

The present invention generally relates to a casing for a computer, and more particularly a casing for a portable computer which provides enhanced heat dissipation to the ambient atmosphere.

DESCRIPTION OF THE RELATED ART

Due to increasing power demands of a microprocessor in portable computers (e.g., laptops) such as Thinkpads®, serious heat dissipation problems exist in such computers which affect integrity of the computer and long-term reliability thereof, as well as affect the comfort of the operator.

Indeed, the power increase requires an increase in power dissipation, a natural consequence of the increased power demands required for enhanced functionality and complexity of the newer microprocessors. The discomfort of the heat is especially disagreeable to the operator (e.g. with the laptop placed on the operator's lap). Further, sufficient cooling must be provided to prevent overheating, thereby to assure proper operation of the computer's components.

Several methods for dissipating the increased heat have been suggested but solutions so far have been impractical and cumbersome to implement.

For example, hinged heat pipes have been employed, but this approach has not proven especially effective. Specifically, with this concept, the heat pipes are placed within the electronic component part of the case, and the opposite ends of the pipes are connected to a member behind the display panel where the areal surface dimension is relatively large for heat dissipation.

Thus, presently, the heat dissipation problem is being addressed by using these complicated configurations employing heat pipes.

Furthermore, the use of heat pipes is relatively costly. In order to be effective, heat pipes must dissipate vaporization heat contained within one end of the pipe to a relatively cooler region (e.g., a portion of the computer).

Specifically, one end of the heat pipe typically must be extended out to the side or into/near the much cooler display region (e.g., or to some other relatively cooler portion away from the source of heat of the microprocessor which is expensive and mechanically difficult. In order to dissipate heat to the display region, the pipes must be hinged which adds to the mechanical complexity of their use as well as increasing cost.

Moreover, heat pipes require substantial heat sinking to the part to be cooled (e.g. the microprocessor) in order to be effective which also tends to be impractical for laptop computers due to the limited available space.

SUMMARY OF THE INVENTION

It is therefore an object of the present invention to provide a a casing for housing a computer, and more particularly to a casing for a portable computer which provides enhanced heat dissipation to the ambient atmosphere compared to those commonly in use today.

With the unique and nonobvious structure of the present invention, a casing for a computer (e.g., laptop) is provided which enhances heat dissipation to the ambient atmosphere, much more simply and inexpensively as compared to the conventional systems.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1A:
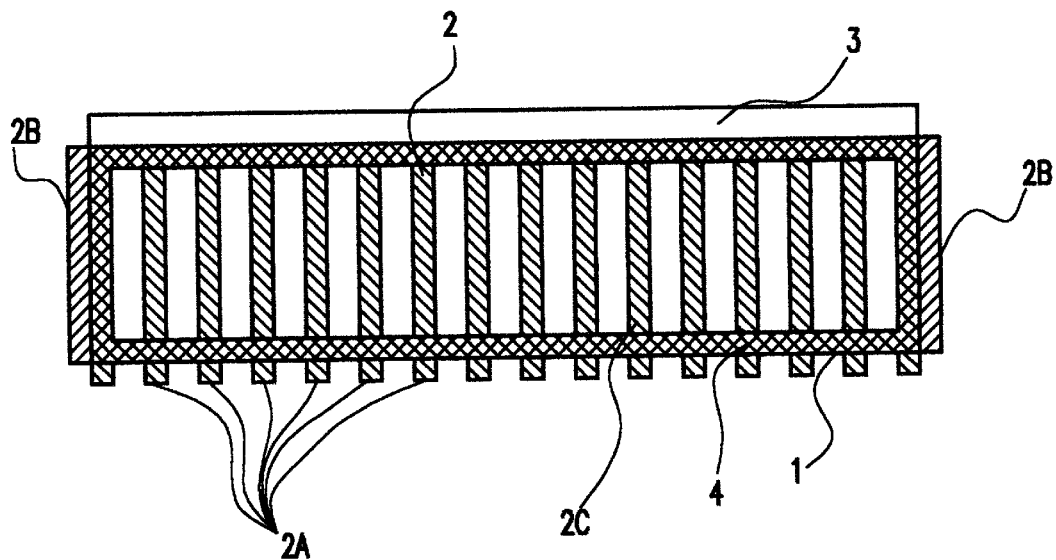
FIG. 1A is a front view of a casing for a portable computer according to a first embodiment of the present invention.

Referring now to the drawings, there are shown several embodiments of the present invention, each involving relatively simple and inexpensive design changes of a computer case (e.g., preferably a portable computer case) with minimal or no additional parts. Thus, the thermal problems of the conventional arrangements can be overcome easily and inexpensively since the below-described embodiments affect only the computer case with no additional cooling pipes, fixtures or other added substantial components.

Generally, a first concept includes a redesign of the case enclosing the computer components. The suggested case should be formed preferably out of metal to have a continuum of closely spaced ribs. These ribs preferably are a part of and are formed from the sides and bottom of the case and replace the present smooth outer surface. In this design, the ribs will function as heat fins to provide a much more efficient means for transferring heat to the ambient air. The heat transfer is proportional to the surface area.

The ribbed structure presents a much larger area to the ambient air, thereby functioning in a manner similar to a refrigerator or an automobile radiator used for cooling the compressed refrigerant or water/anti-freeze respectively. The size and spacing of the ribs is determined from the amount of heat that needs to be dissipated as well as the material used for the case sides.

Figure 1B:
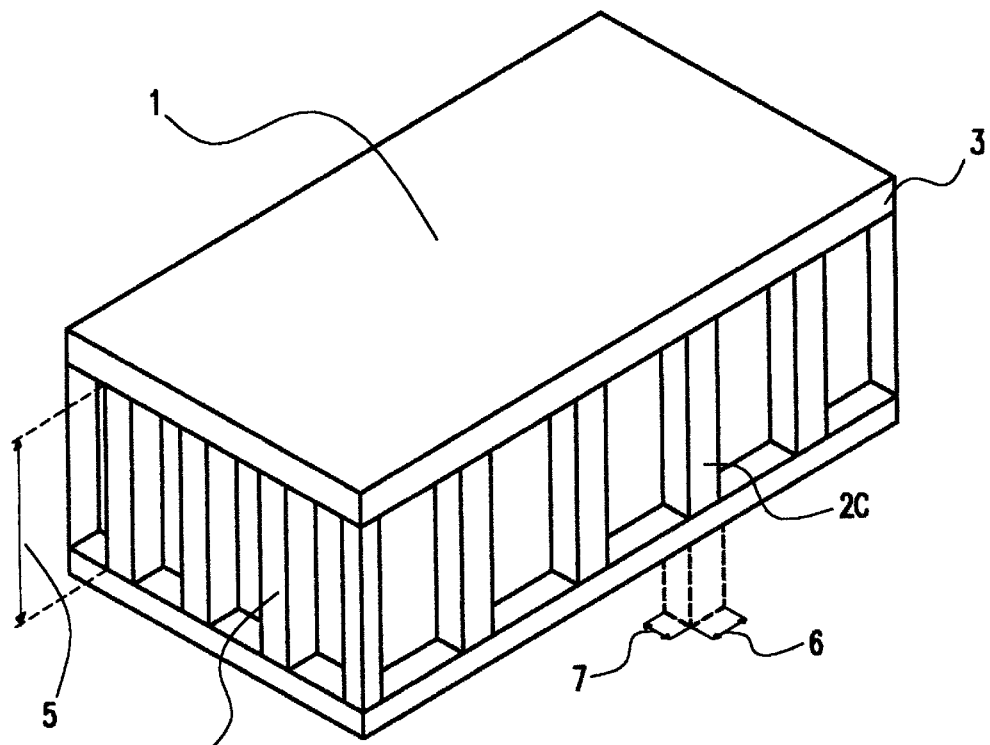
FIG. 1B is a perspective view of a casing according to a first embodiment.

Looking in detail at the first embodiment of the inventive computer casing and turning to front view FIG. 1A and perspective view FIG. 1B, an outer case 1 (e.g., box) is provided for housing computer components including a microprocessor, memory devices, etc.

The case 1 is formed preferably, though not necessarily, out of metal or thin resilient plastic such as presently used for laptop cases, and has a conventional substantially square or rectangular shape. Obviously, with suitable design modifications, the case 1 could have any of a number of polygonal or non-polygonal (circular, oval, etc.) shapes.

Figure 2A:
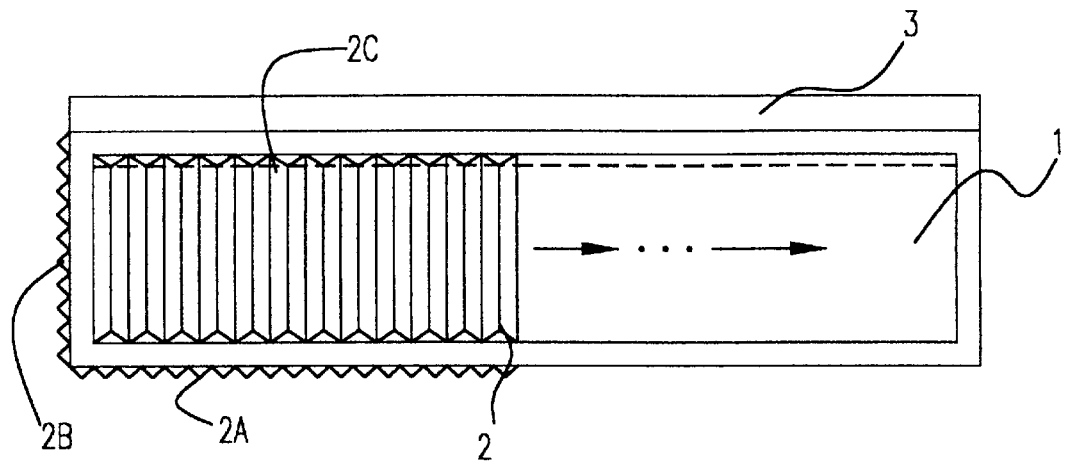
FIG. 2A is a front view of the computer casing having a corrugated structure.
Figure 2B:
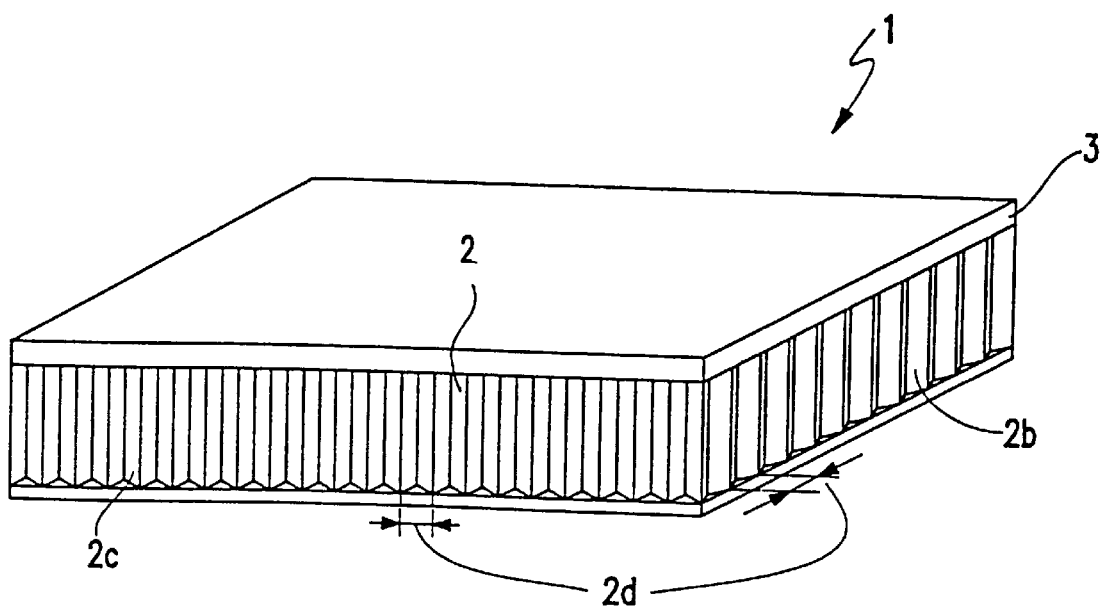
FIG. 2B is a perspective view of a casing having a corrugated structure.

The case 1 includes a continuum of closely spaced ribs 2 (shown in FIGS. 1A and 1B as rectangular columns 2a, 2b and 2c) protruding at the outer surface of the case 1 for dissipating heat from the computer. Shown also is a display screen 3 (e.g., a liquid crystal display or the like) and the bottom plate 4. The ribs can be rectangular or, preferably, triangular in shape in the lateral dimension as shown in FIGS. 2A and 2B.

Preferably, adjacent ribs 2a–c are spaced apart within a range of 0.5 cm to 1.0 cm for rectangular ribs. For triangular shaped ribs the spacing between the adjacent apexes of the triangles may vary from 0.5 cm to 1.5 cm, though is not limited thereto. While the ribs 2 preferably are each spaced apart from adjacent ones by the same distance (e.g., a uniform pitch), the ribs could be spaced apart differently depending upon their position on the outer surface of the case and their proximity to heat generating computer components.

Preferably, the ribs 2 are an integral part of the four peripheral sides of the case 1, replacing the smooth outer surface typical of laptops on the market today. Specifically, ribs 2c are provided at the front of the case and ribs 2b are provided at the sides of the case 1. Further, ribs 2a (shown in front view FIG. 1a but not shown in perspective FIG. 1b) are provided at the bottom of the case. The ribs 2 may be formed as the sides and/or bottom of the casing itself. For example, as shown in FIG. 2A, the ribs 2 are formed as corrugations on the sides and bottom 4 of the case 1, and the display 3 and peripheral edges of the bottom 4 are extended to cover the top and bottom of ribs 2.

Ribs 2 function as heat fins for providing an efficient means for transferring heat to the ambient air. Specifically, the ribs 2 increase the case's effective surface area and thus the effective area for dissipating heat to the ambient atmosphere. FIG. 2A shows a front view with a triangular ribbed structure 2b on one or more sides of case 1. The top portion 3 contains the display and does not require cooling though this portion of the case 3 could also be ribbed.

The size of the ribs is chosen based on the needed cooling capacity, with the rectangular ribs preferably having a width 6 of within a range of 0.2 cm to 1.5 cm and a length 5 equal to the height of the laptop container (excluding the display panel) and a depth 7 of within a range of 0.5 cm to 1.5 cm.

For example, ribs that result in a doubling of the area of the case will to a first approximation double the heat loss by convection. The reduction in temperature within the case will be substantial for triangular ribs designed with a small pitch 2d, 1 cm in width and with a 1 cm protrusion. This innovation can be achieved very simply without any moving or hinged parts while simultaneously being extremely efficient. For example, such ribbed or corrugated parts can easily be produced by a stamping process well known in the art.

Figure 3:
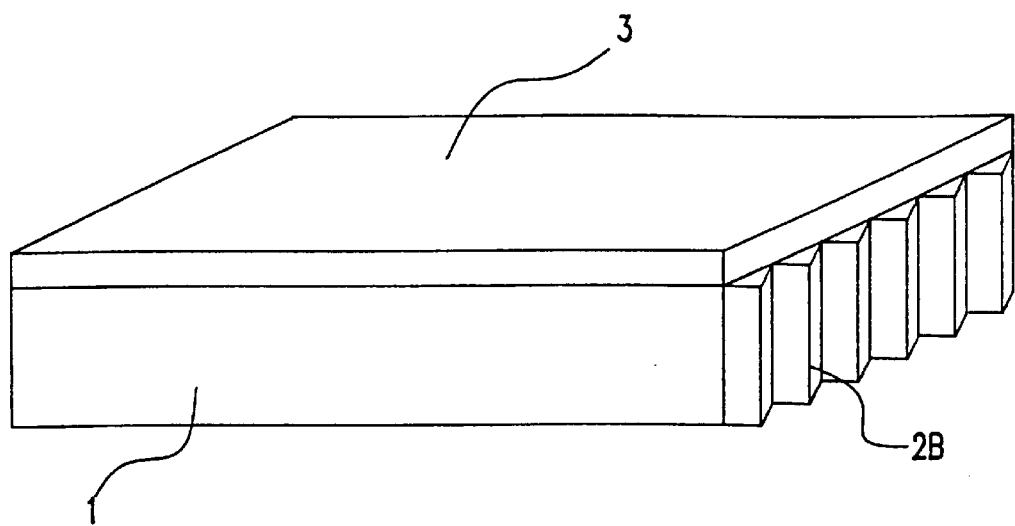
FIG. 3 is a perspective view of a modified configuration having a corrugated structure on a side of the computer casing.

To minimize heating of the bottom surface, in a modified embodiment of that shown in FIGS. 1a and 1b, the ribs 2a can be excluded from the bottom surface of the case 1, so long as ribs 2 are positioned on at least one of the four sides of the case 1. Such a configuration is shown in FIG. 3. By enhancing heat dissipation from the sides, this modified design assists in preventing the bottom surface of the case from becoming overly warm (e.g., greater than 98 degrees F.), which is a present problem for some advanced laptop models with larger microprocessors, thereby causing thermal discomfort to the user.

For maximum radiation cooling from the ribbed sides, the outer surface is preferably opaque (e.g., black), to approximate the appearance of a black body radiator while the inner surface should be a light color for minimum black body re-radiation into the case from the inner surfaces of the sides, heated by the joule dissipating parts within the case.

With the casing of the aforementioned embodiment, i.e. ribbed sides only, enhanced heat dissipation to the ambient atmosphere is provided, thereby relieving discomfort for the operator and maintaining integrity and reliability of system components.

Second Embodiment

Generally, the second embodiment involves selectively positioning the microprocessor, the main source of joule heat, to be in close proximity to any one of the four sides of the case. This side preferably has small openings near the processor to allow convection and radiant cooling to the outside ambient air. A second set of slots permits the drawing in of the cooler ambient air thereby providing additional cooling by convective circulation within the case.

Figure 4:
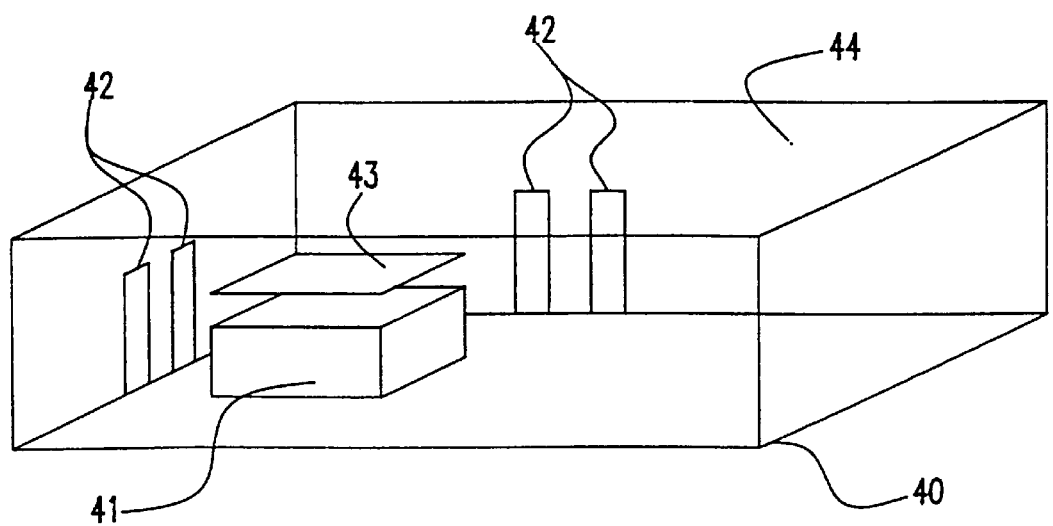
FIG. 4 is a perspective view of a casing for a portable computer according to a second embodiment of the present invention including slots and illustrating a microprocessor positioned near the slots.

Turning now to the second embodiment of the casing 40 according to the present invention and as shown in FIG. 4, the microprocessor 41 computer component in the casing is selectively positioned so as to be optimally cooled. As mentioned above, the microprocessor 41 is the main source of joule heat.

Specifically, the microprocessor 41 is positioned in the casing 40, so as to be in close proximity to any one of the four sides of the case 40. For example, preferably the microcomputer 41 is situated within a range of 1 to 2 cm of a selected side of the case 40.

In the case 40 of the second embodiment, the selected side preferably has small rectangular openings 42 (e.g., vent slots on the order of 0.5 cm wide, 0.75 cm center to center) near the processor to allow convective and radiant cooling to the outside ambient air.

As shown in FIG. 4, a second set of rectangular slots 42, preferably positioned on a side adjacent to the selected side, allows ambient air to enter to provide maximum convective cooling.

Further, optionally, a small heat deflecting element or heat shield 43 may be provided over the microprocessor 41 to enhance the flow toward the slotted side rather than vertically to the top surface of the case 44 which would normally house the keyboard, not shown.

It is noted that both configurations of the first and second embodiments may be employed together, thereby resulting in maximum cooling efficiency.

Third Embodiment

As shown in FIG. 5A–D, a third embodiment of the invention is provided.

Figure 5A:
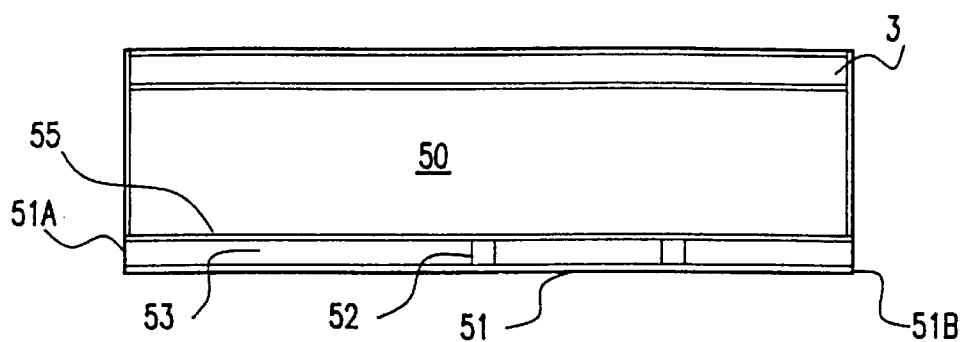
FIG. 5A is a front view of a computer casing of the present invention according to a third embodiment.
Figures 5C, 5D:
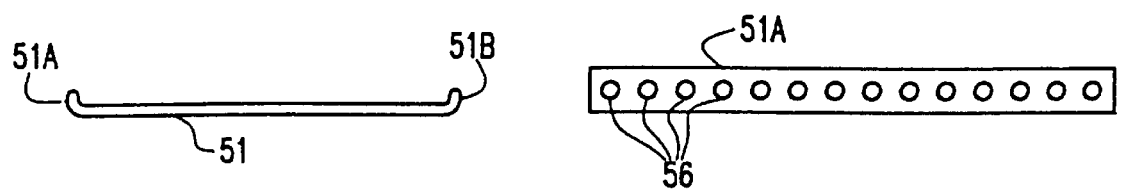
FIGS. 5C and 5D show details of a bottom plate used to implement the third embodiment.
Figure 5B:
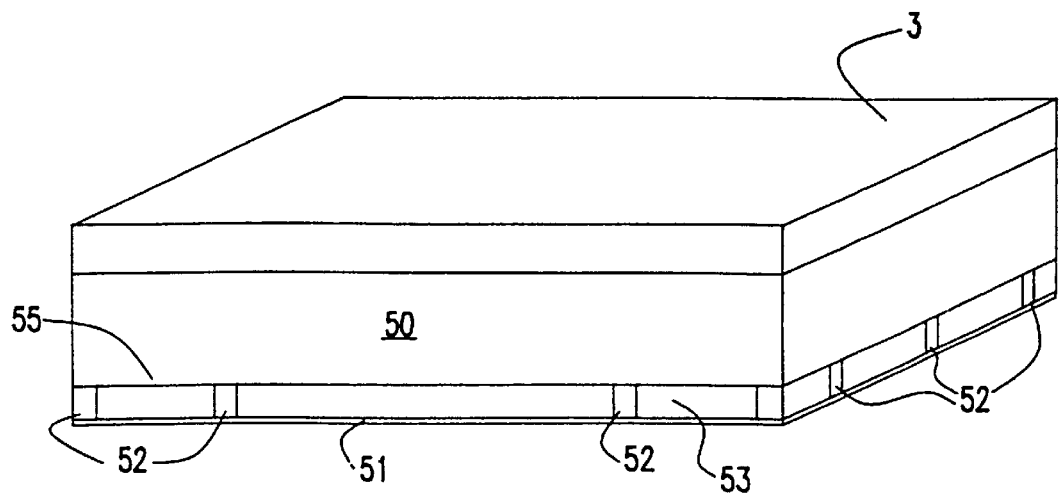
FIG. 5B is a perspective view in accordance with the third embodiment.

The third embodiment includes a casing 50 in which a thin plate 51, preferably non-metallic and in the range 0.5 mm to 1.5 mm thick, is provided including small peripheral edges 51a, 51b on the order of 1–2 mm in height and which are curved as shown in detail FIG. 5C, to meet the intersections of the sides of the case 50 with the bottom surface of the case 55. The small edges 51a, 51b are positioned at substantially right angles to the plate 51. While only two opposite edges 51a, 51b are shown in the drawing, in the preferable implementation all four peripheral edges of plate 51 are so positioned.

As shown in FIG. 5A–D, the plate 51 is attached in a configuration that includes a thin gap 53, in the range of 1–5 mm thick, between the case bottom 55 and the plate 51. The plate 51 is supported by the bottom of the case 51 through supports 52, so that a gas (e.g., air) occupies gap 53. The plate 51 is continuous across the entire bottom surface of the case 50.

The gas (e.g., air) trapped in the gap 53 between the case bottom 55 and the plate 51 serves as a very effective heat insulator since air has a very low thermal conductivity. It is noted that, instead of air, another gas could be affirmatively provided therein for providing even greater heat insulation of the container, so long as the peripheral edges are hermetically sealed. For air, the peripheral edges need not make a sealed connection to the bottom of the case 55. In yet another embodiment, plate 51 has openings 56 along the right angled extension of the peripheral edges as shown in FIG. 5D to allow air flow, thereby providing additional cooling for the bottom plate 51.

Thus, very little heat can be transferred through this surface, thereby keeping it relatively cool since air (gas) is an excellent thermal insulator. The majority of the heat will be transferred through the case sides, since the gap serves as a heat barrier. In this manner, there is little or no danger or discomfort in having the portable computer resting on an operator's lap, since this surface will remain relatively cool.

The thin plate 51 is preferably formed from sheet metal to maintain the thinnest possible computer casing thickness/profile, or from plastic. The plate 51 must have a relatively high rigidity, and thus additional supports 52 such as screws and standoffs (or washers) of low thermal conductivity may be required along various suitable portions of the plate.

With the unique and nonobvious structures of the embodiments of the present invention, a casing for a computer (e.g., laptop) is provided which enhances heat dissipation to the ambient atmosphere, as compared to the conventional systems. It is clear that the corrugations could be rotated 90 degrees, i.e. span the case 1 laterally without affecting the purpose of the invention.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. A casing for a portable computer, comprising:

a container for housing a heat-generating element and having a plurality of sides and a bottom; and a plate attached to said bottom of said container, the plate including substantially right angle peripheral edges for attaching said plate to said bottom of said case, wherein a gap is provided between said plate and said bottom of said case for trapping a gas therebetween.

2. A casing as in claim 1 wherein the attached plate is partially open at portions of the peripheral edges to permit cooling by convection.

\* \* \* \* \*